Nov. 7, 1961  H. B. STANDLEY  3,007,275
FISHING DEVICE
Filed Dec. 20, 1960  2 Sheets-Sheet 1
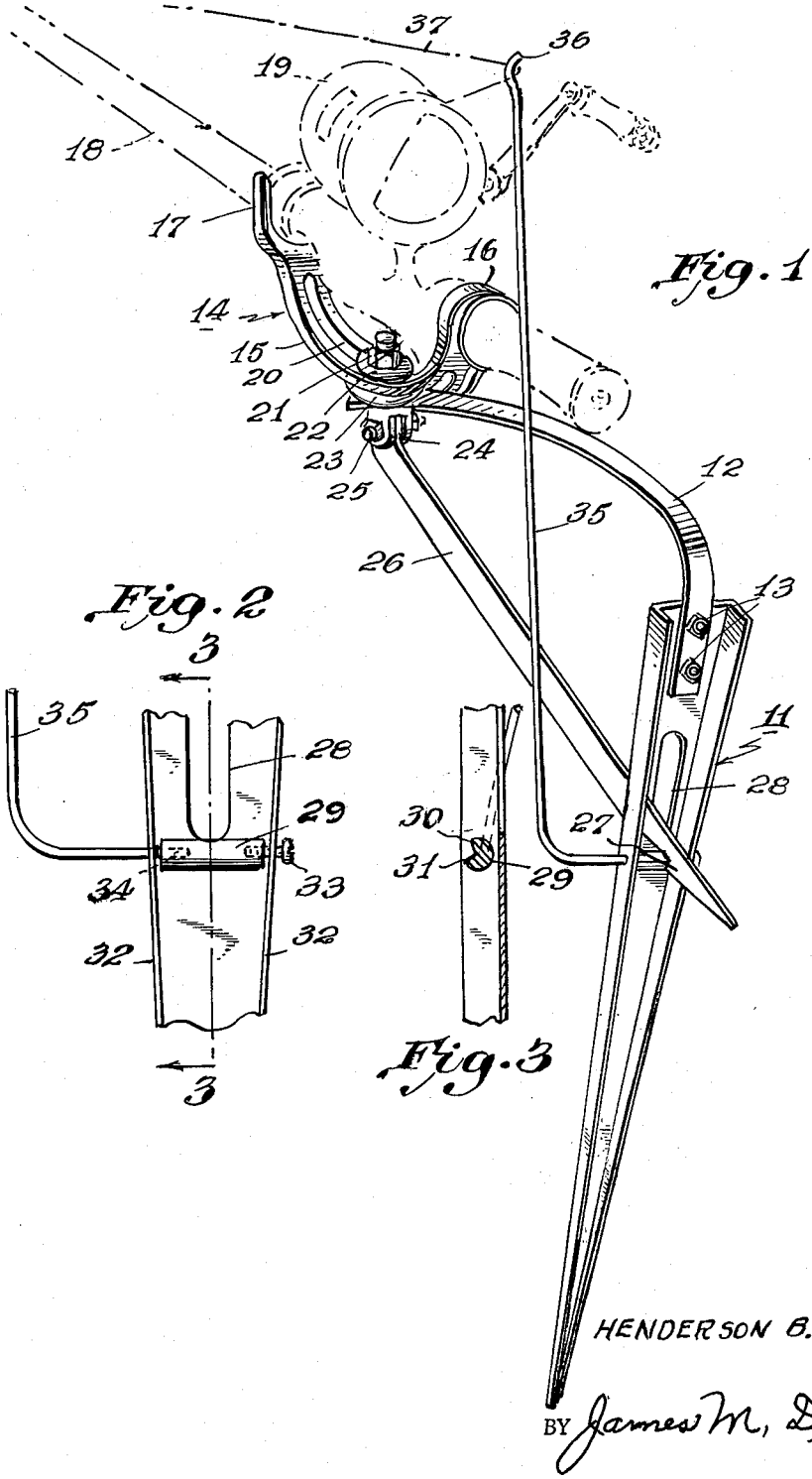
INVENTOR
HENDERSON B. STANDLEY
BY James M. Drysdale
ATTORNEY Nov. 7, 1961     H. B. STANDLEY     3,007,275
FISHING DEVICE
Filed Dec. 20, 1960     2 Sheets-Sheet 2
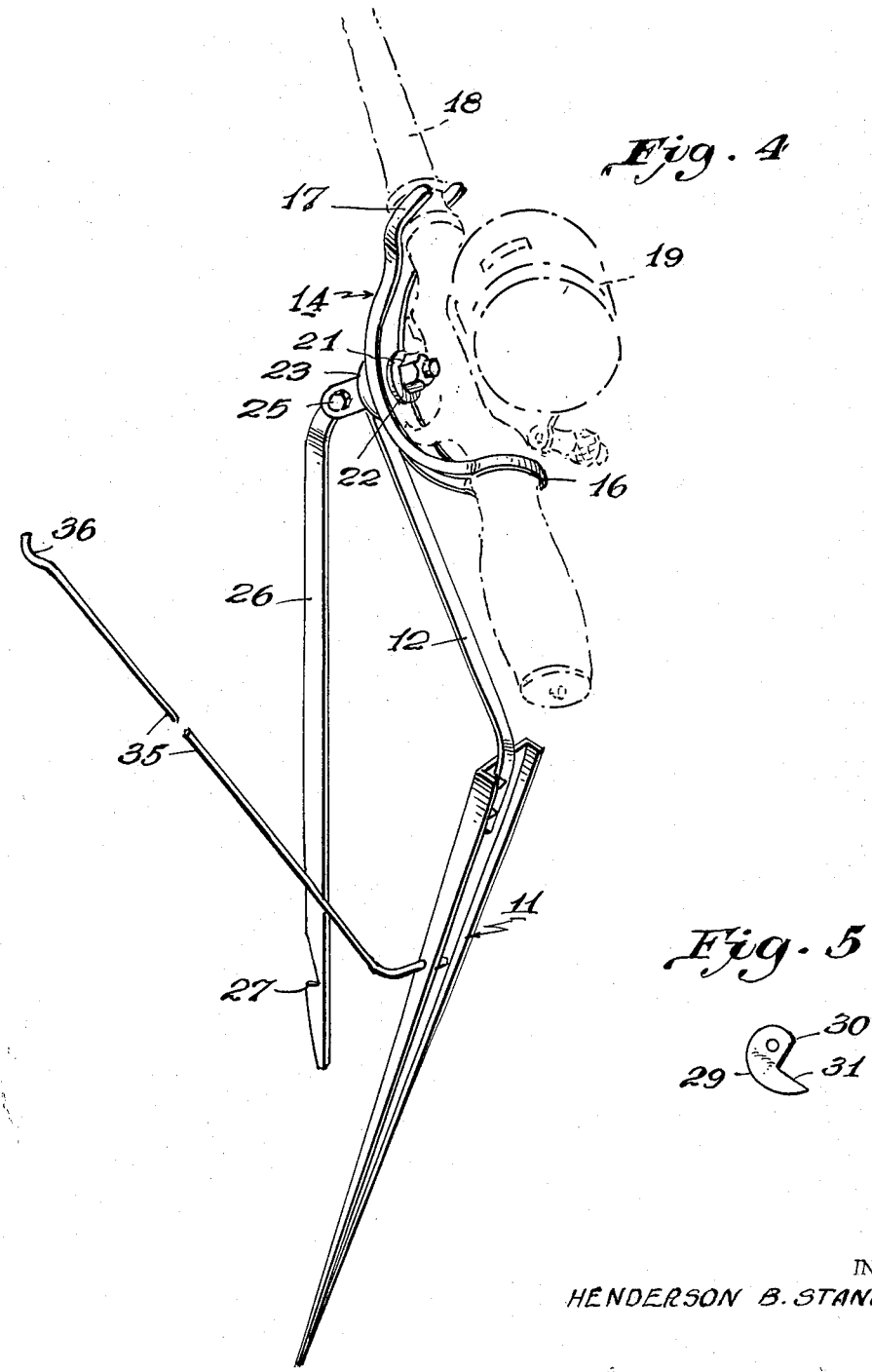
INVENTOR
HENDERSON B. STANDLEY
BY
ATTORNEY United States Patent Office 3,007,275
Patented Nov. 7, 1961

3,007,275
FISHING DEVICE
Henderson Burk Standley, 552 S. Hillside, Wichita, Kans.
Filed Dec. 20, 1960, Ser. No. 77,193
2 Claims. (Cl. 43—15)

This invention relates to a hook setting means for use in conjunction with fishing rod holders. Rod holders of the type to which the invention relates are intended to support a rod in operative position so that it may be left unattended or at least will not require the constant attention of the fisher. It is desirable to provide such holders with a means for setting the hook when a fish pulls on the line or nibbles the bait in order to hook the fish in much the same manner as when the rod is manipulated by a skilled fisherman.

It has heretofore been proposed to provide fishing rod mounts with means for swingably mounting the rod holder in such a manner that a sufficient pull on the line may trip a spring mechanism and cause the fishing rod to move in an arc with enough force to set the hook. A major difficulty with such devices resides in the fact that if the trip or triggering means for releasing the spring mechanism is sufficiently delicate to respond to the slight pull of a fish on the line it may also respond to fortuitous forces such as a slight jarring of the holder.

It is a primary object of this invention to provide a fishing rod mount having spring means capable of actuating the rod in a hook setting motion in response to a slight tug on the line, and having triggering means responsive to the delicate forces so applied but which will be unresponsive to other fortuitous forces.

Further objects of the invention are to provide a device of the type described which is of simple inexpensive construction, and which is easy to manufacture, to assemble and disassemble.

The attainment of the foregoing and other objects and features of the invention will be made fully apparent to those skilled in the art from a consideration of the following detailed description taken in conjunction with the accompanying drawings in which:

FIG. 1 shows, in perspective, a fishing rod support provided with hook setting means in accordance with the invention and showing such hook setting means in the position it occupies prior to the release of the spring which effects the hook setting motion.

FIG. 2 shows in front elevation and on a scale which is enlarged relative to FIG. 1, a detail of the triggering mechanism.

FIG. 3 shows a section taken on the line 3—3 of FIG. 2.

FIG. 4 is a view corresponding to FIG. 1 but showing the device after the triggering means has been released.

FIG. 5 shows, on an enlarged scale, an end view of the cam.

Referring to the drawings, a support, indicated generally at 11, is pointed at one end to permit its being forced into the ground, and at its other end is provided with bolts 13 securing a leaf spring 12 thereto. In the instance shown the support 11 is channel shaped in cross section but tapers longitudinally to provide the pointed lower end and the relatively broad upper end to which the spring is attached. It will be understood that the support 11 may take other forms since, for example, the lower end may be formed to facilitate the fastening thereof to some portion of a boat. However, the form shown is especially desirable where the support is to be driven into the ground and may be adapted to other positions such as the edge of a boat by the use of separate clamps or fasteners. The spring 12 is a relatively stiff strip of spring steel which is bent at the end attached to the support 11. The general form of the spring in its unstressed state may be seen in FIG. 4. I have found that a spring of suitable strength and stiffness may be provided by shaping a piece of #1095 steel and thereafter heat treating to convert it into spring steel.

A rod holder 14 is mounted on the outer end of the spring 12 and comprises an arcuate body 15 having an eye 16 at one end and a forked portion 17 at the other. The eye 16 is adapted to receive the end of a fishing rod 18 while the fork 17 receives and supports the rod at a point sufficiently spaced from the eye 16 that the rod grip and the reel 19 will lie therebetween. The arcuate body 15 of the rod holder is provided with a slot 20 extending for a major portion thereof and the holder is secured to the spring 12 by means of a bolt 21 passing through this slot and through a hole in the outer end of the spring. A washer 22 is provided between the arcuate body portion 15 of the holder and the nuts on the end of the bolt 21 and a washer 23 is provided on the opposite side of the body between the same and the head of the bolt. This head is made in the form of a yoke 24, and a bolt 25 passing through the arms of the yoke provides a pivoted attachment for one end of a latch arm 26. The opposite end of the latch arm 26 is provided with a notched portion 27 forming a hook. This notched end portion of the latch arm 26 is adapted to extend through a slot 28 in the face of support 11 and engage a pivoted detent and camming member 29. The length of the arm 26 is such that the spring 12 must be substantially deformed or bent from its normal position before the notched end portion 27 can engage the hook retaining face 30 of the cam 29. A hook lifting face 31 is provided on the cam below and roughly at a right angle to the face 30. The cam is pivotally supported between the side walls 32 of the support 11 by means of a screw 33 at one end thereof and extending through one side wall, and by the end portion 34 of a rod 35 which extends through the other side wall and is fixed in the cam 29. The outer end of the rod 35 has a hooked portion 36 adapted to engage the line 37.

In operation, when the parts are in the position shown in FIG. 1, the spring 12 is bent downwardly and the hooked end 27 of the latch arm 26 is engaged against the face 30 of the cam 29. The pivotal axis of cam 29 as provided by the screw 33 and rod 34 lies inwardly of the surface 30 and between the upper and lower edges thereof. The outwardly and upwardly directed pull of the spring 12 as exerted through the arm 26 against the surface 30 does not tend to turn the cam in a direction to disengage the hook but rather tends to maintain the cam in set position with the edge of the hook 27 resting squarely against the face 30. In this position of the cam, the rod 35 which is fixed thereto, extends upwardly to a point adjacent the reel 19 so that the line 37 may be readily engaged over the hook 36. Upon a slight pull on the line 37, the rod 35 is turned to the left from the position shown in FIG. 1 and the cam 29 is thereby turned in a clockwise direction from the position seen in FIG. 3. Thus, it is not necessary to lift the hook 27 for a distance corresponding to the height of the surface 30 in order to release the latch since the surface is swung to an angle at which the hook can slide over it without significant resistance by a very small turning movement of the cam. Upon release of the latch the spring 12 returns to its normal unflexed state as seen in FIG. 4, thus moving the rod 18 through a hook setting arc.

The rod may be readily lifted from or replaced in the holder 14 and the angle of the pole relative to the spring 12 may be adjusted by loosening the bolt 21 and shifting the holder to the desired position by means of the slot 20. On tightening the bolt the holder is held firmly in the desired position by gripping the arcuate body portion 15 between the washers 22 and 23.

Since changes, variations, and modifications in the particular form, construction, and arrangement of the elements shown and described may be had without departing from the spirit of my invention, I wish to be understood as being limited solely by the scope of the appended claims rather than by any details of the illustrative showing and foregoing description.

I claim:

1. A mounting means for a fishing rod comprising a support member, a leaf spring having one end thereof secured to said support, a fishing rod holder mounted on the opposite end of said spring, a latch arm secured to said spring adjacent said holder, trigger means mounted on said support for releasably engaging the end of said latch arm remote from said spring to hold said spring in a deformed state, and an actuator connected to said trigger and means on said actuator for receiving a portion of a line of a fishing rod.

2. A mounting means for a fishing rod comprising an elongated support member pointed at one end and of channel shape in cross section, a leaf spring having one end thereof secured to an end of said support remote from said pointed end, a fishing rod holder mounted on the opposite end of said spring, a latch arm having one end pivotally secured to said spring adjacent said holder and the opposite end thereof formed as a hook, cam means pivotally mounted on said support between the side walls defining said channel and having a face engageable with the hooked end portion of said latch arm, an actuating rod having one end rigidly connected to said cam and constituting a pivot therefor, said actuating rod having a free end extending to a point adjacent said holder and means at said end for receiving a portion of a line of a fishing rod.

References Cited in the file of this patent

UNITED STATES PATENTS

| | | |
|---|---|---|
| 371,777 | McCabe | Oct. 18, 1887 |
| 562,195 | Plath | June 16, 1896 |
| 916,891 | Schildbach | Mar. 30, 1909 |
| 2,784,516 | Barnes et al. | Mar. 12, 1957 |